S. A. ELLIS.
PUMP-CYLINDERS.
No. 172,102. Patented Jan 11 1876
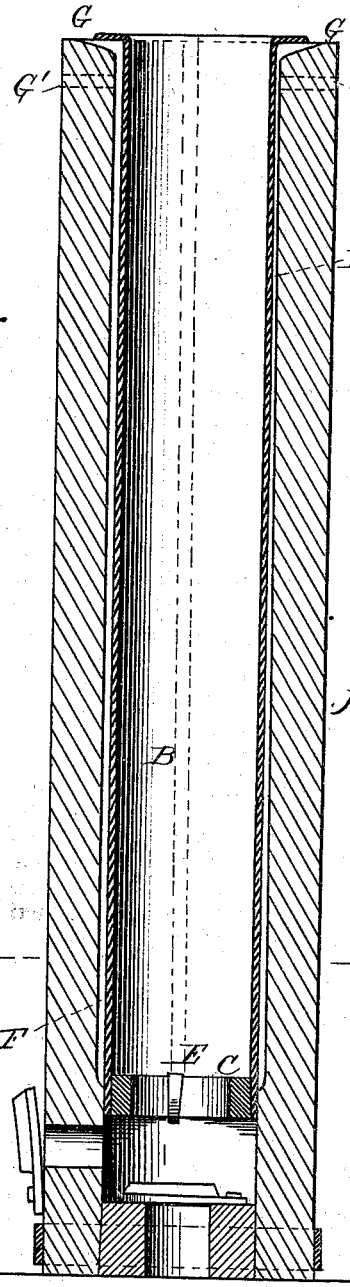
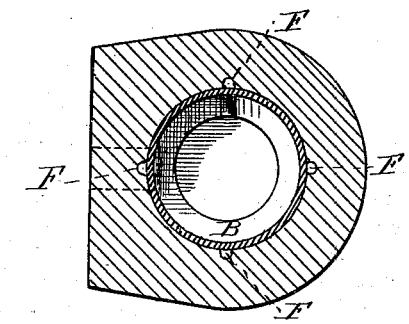
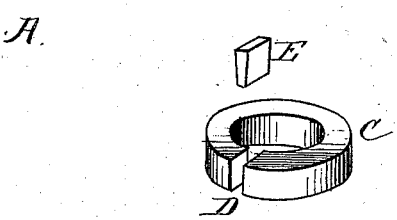
Attest:
Inventor.
Smith A. Ellis
By James L. Norris
Atty.

UNITED STATES PATENT OFFICE.

SMITH A. ELLIS, OF OTTAWA, OHIO.

IMPROVEMENT IN PUMP-CYLINDERS.

Specification forming part of Letters Patent No. 172,102, dated January 11, 1876; application filed June 23, 1875.

*To all whom it may concern:*

Be it known that I, SMITH A. ELLIS, of Ottawa, in the county of Putnam and State of Ohio, have invented certain new and useful Improvement in Pump-Cylinders, of which the following is a specification:

This invention relates to certain improvements in metallic-lined wooden pump-cylinders, its object being to provide for fastening the metallic lining securely within the bore of the wooden cylinder, at or near its lower end, for the purpose of preventing the ingress of water between the lining and the bore; and also to provide for the egress of any water that may possibly find its way between the metallic lining and the wooden cylinder.

My invention consists, first, in a split ring of metal, wood, or other suitable material adapted to fit inside the metallic lining, and which can be enlarged after it is inserted by means of a wedge driven into the split, in order to press the lining closely against the interior of the wooden cylinder, and effectually prevent the ingress of water between the two; and, second, in the combination with the wooden cylinder, and the metallic lining of a series of longitudinal grooves on the inside of the wooden cylinder, extending to the top of the same, and communicating with a series of open channels for the egress of any water that may possibly leak between the lining and the cylinder, as hereinafter fully set forth.

In the drawings, Figure 1 represents a sectional view of my improved pump-cylinder; and Fig. 2 a top view of the same.

The letter A represents the wooden cylinder, properly bored, and B the metallic lining, formed of any suitable metal, and set and confined in the cylinder in any convenient manner. C represents the split ring, divided at D, as shown, and adapted to fit into the bore of the lining. Said ring is secured in the lining just above the valve at the bottom of the cylinder, and is expanded therein by means of a wedge, E, driven forcibly into the slit C, so as to force the metallic lining into close contact with the interior of the wooden cylinder, and thus effectually prevent the ingress of water between the two. The letter F represents a series of longitudinal grooves formed in the interior of the wooden cylinder, and extending from a point near the bottom of the same to the top thereof, where they communicate with a series of open channels or passages, G or G'.

The object of said channels and passages is to allow any water which may find its way into the tube by reason of any possible defect in the joint at the bottom, between the lining and wooden casing, to be ejected from between the two upon the downward stroke of the piston, and thus prevent the rupture of the casing which would be liable to take place if the water were confined.

As thus constructed it is evidently almost impossible for any water to leak between the lining and cylinder, and in case any should, by accident, leak between the same, provision is made, through the longitudinal grooves, for its escape, thus avoiding any possible injury to the cylinder or the lining by reason of the presence of water between them.

Having thus described my invention, what I claim, and desire to secure by Letters Patent, is—

1. The split ring, adapted to fit in the metallic lining of a wooden pump-cylinder, and capable of being enlarged or expanded therein by means of a wedge, in order to force the lining into intimate contact with the cylinder, and thus prevent the ingress of water between the two, substantially as described.

2. In combination with said wooden cylinder and metallic lining, the longitudinal grooves in the interior of the cylinder, leading into open channels at the top for the escape of any water that may incidentally find its way between the lining and cylinder, as and for the purpose set forth.

In testimony that I claim the foregoing I have hereunto set my hand.

SMITH ALEXANDER ELLIS.

Witnesses:
   F. N. ELLIS,
   ANTHONY DEERUP.